United States Patent Office 3,156,819
Patented Nov. 10, 1964

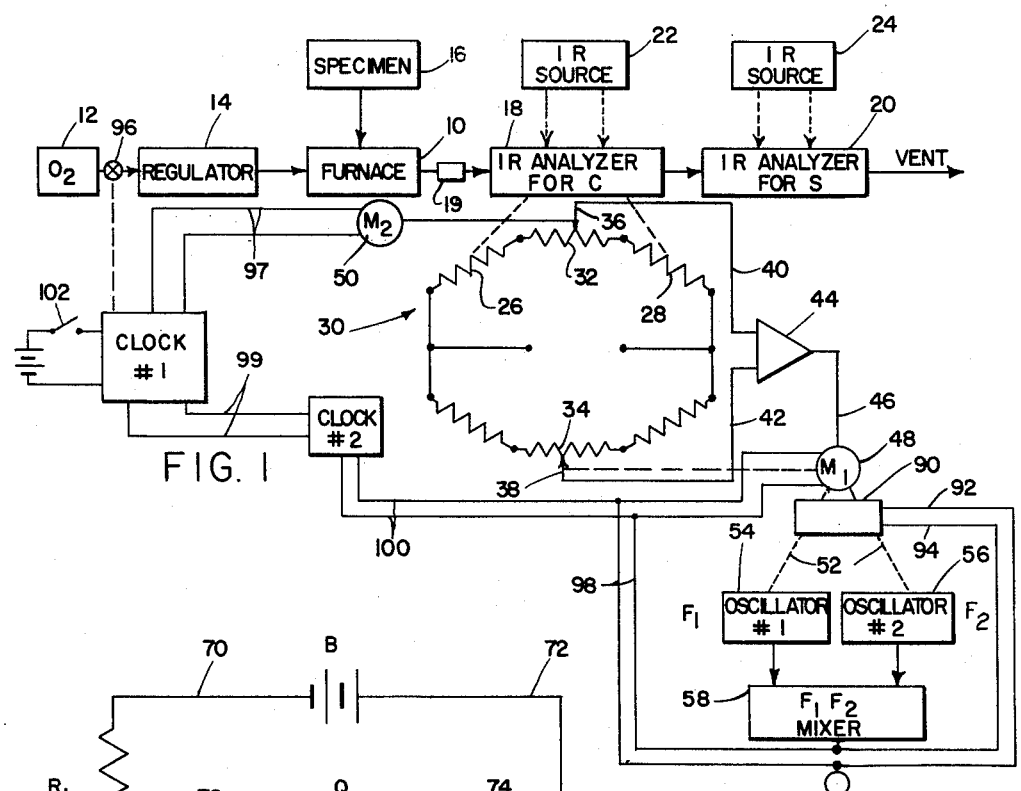
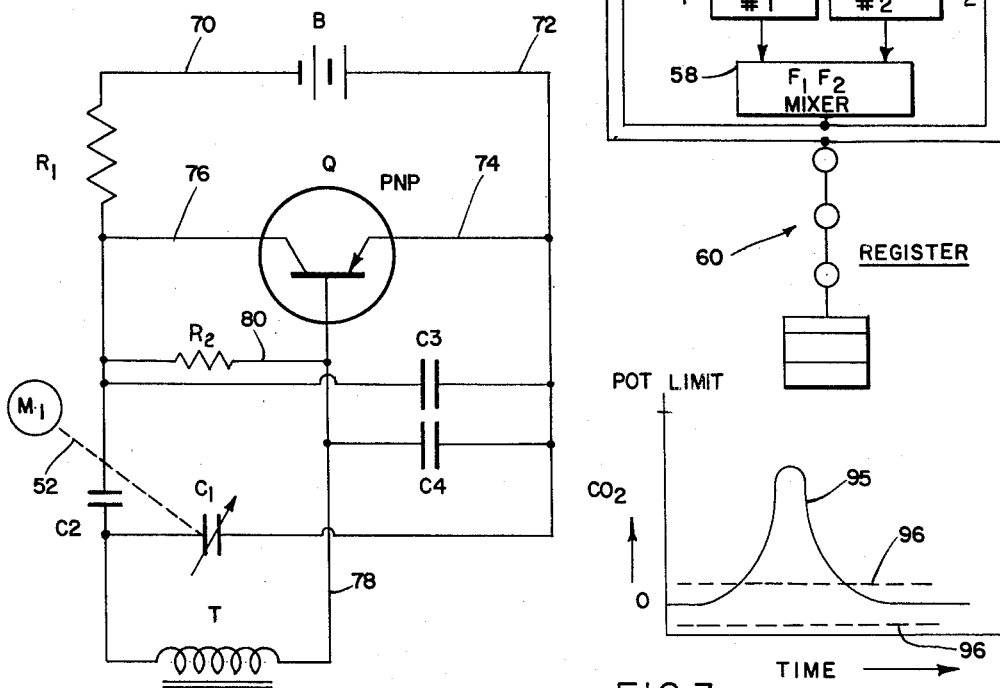
Nov. 10, 1964     G. E. SMITH ETAL     3,156,819
AUTOMATIC ABSORPTION ANALYZING SYSTEM
Filed Aug. 29, 1961
INVENTORS
GLENN E. SMITH
PAUL C. WATSON
BY
*Morse & Altman*
ATTORNEYS

3,156,819
AUTOMATIC ABSORPTION ANALYZING SYSTEM
Glenn E. Smith, Cambridge, and Paul C. Watson, Arlington, Mass., assignors to Baird-Atomic, Inc., Cambridge, Mass., a corporation of Massachusetts
Filed Aug. 29, 1961, Ser. No. 134,691
10 Claims. (Cl. 250—43.5)

This invention relates in general to automatic instrumental analyzers and more particularly concerns a novel apparatus for quantitatively analyzing chemical compounds, both organic and inorganic, by a radiation absorption device coupled with electronic integrating equipment adapted to provide an output signal indicative of the amount of a particular constituent present in any given compound or of the components in a mixture.

Historically, quantitative analysis techniques have been rather slow and tedious, involving a number of separate steps each of which must be carefully executed to insure the highest degree of accuracy. while the results obtained by existing procedures and apparati are satisfactory when rigorous precautions are followed, the time element involved and the possibility of error often render existing measures inexpedient where speed and reliability are required.

Accordingly, it an object of the present invention to provide a quantitative analyzer that is both quick and accurate in operation.

Another object of this invention is to provide a quantitative analyzer that is capable of simultaneously providing information on concentrations for a plurality of constituents in a given compound. Particular constituents contemplated for analysis in accordance with the present invention are carbon and sulfur, which in the past have been difficult to analyze at the same time.

Yet another object of this invention is to provide in a quantitative analyzer an improved oscillator circuit capable of generating substantially pure sine waves for use in integrating circuitry.

A further object of this invention is to provide a quantitative analyzer that is fully automatic and which provides a locked output at the end of each cycle of operation.

More particularly, this invention features a radiation analyzer in which resistance detecting elements form arms of a self-balancing bridge. A servo-motor is used to maintain the bridge in balance and also to shift simultaneously the frequencies of a pair of variable oscillators in such a manner that the frequency of one oscillator is increased while the frequency of the other is decreased a like amount. The difference in frequencies between the oscillators is thus a function of the concentration of the particular substance being monitored by the anlyzer and may be readily converted into a visual display for the operator.

Another feature of this invention concerns a novel control circuit for operating the analyzer automatically in timed sequence and to eliminate erroneous signals due to servo drift. Still another feature of this invention concerns a unique arrangement for controlling the flow of gasses through the system so that a constant, volumetric flow passes through the detecting zone.

But these and other features of the invention, along with further objects and advantages thereof will become more readily apparent from the following detailed description taken in connection with the accompanying drawings in which:

FIG. 1 is a schematic view of a preferred embodiment of the invention;

FIG. 2 is a circuit diagram of one of the oscillators indicated in block in FIG. 1; and FIG. 3 is a graph showing a typical curve that may be drawn to display the relationship of the concentration of the analyzed substance with respect to the duration of a cycle of operation.

Referring now to FIG. 1 of the drawings, reference character 10 generally indicates a high temperature electric furnace which is connected to a source of oxygen 12 through a regulator 14. The furnace 10 may be any one of a number of commercially available resistance or inductance units and, preferably, should be capable of a fairly wide range of temperatures to provide flexibility of operation. A selected specimen 16 is deposited in a porcelain vessel and placed in the furnace 10. There the specimen is oxidized and all resulting gaseous oxides fed into one or more tandem connected infrared analyzers 18 and 20.

With a resistance type furnace optimum results will be achieved if the specimen is rapidly oxidized by permitting it to reach maximum temperature before oxygen is admitted to the furnace. Also, considerable attention should be given to the regulator 14 to insure that a uniform pressure of oxygen is delivered to the furnace.

By way of example, let us assume that the specimen 16 constitutes a measured charge of steel pellets and that the specimen is to be quantitatively analyzed for carbon and sulfur content. The gaseous mixture resulting from the oxidation of the specimen will include, among other things, $CO_2$ and $SO_2$ in unknown concentrations. The gases are delivered from the furnace 10 first to the infrared analyzer 18, which is adapted to detect the presence of $CO_2$, and next to the infrared analyzer 20 which is adapted to detect $SO_2$.

In line between the discharge side of the furnace 10 and the input side of the analyzer 18 is a capillary 19 which cooperates with the regulator 14 to provide a constant volumetric, laminar flow of the gases through the analyzers. Despite the presence of the pressure regulator 14 the flow through the analyzers, without the capillary would vary because of the formation of various iron oxides which are formed and make a demand on the oxygen. It will be appreciated that if the flow stopped an erroneous answer would result since the same molecules would be recounted by the integrating portion of the system. Thus it is critical that a constant volumetric flow be maintained. It will also be appreciated that if an orifice was substituted for the capillary the resulting signals would be a function of the mass of flow, which varies from $O_2$, $CO_2$ and $SO_2$, rather than being a function of volumetric flow. With the present arrangement a constant volumetric flow is assured independent of the demands on the oxygen or pressure variations in the furnace so that the measurement is a true integral and independent of the weight of the sample or other variables.

The operation and construction of infrared analyzers are well known in the art and will not be described in detail. Both analyzers are provided with a source of infrared radiation 22 and 24 and are otherwise identical in every respect with the exception that the first analyzer 18 has a sample cell charged with $CO_2$ while the second analyzer 20 has its sample cell charged with $SO_2$.

Associated with each analyzer is an integrating system which is adapted to indicate the total amount of carbon or sulfur passed through the particular analyzer. Insofar as these integrating systems are nearly identical, only the system associated with the carbon analyzer has been illustrated in FIG. 1 and the description will be limited to that system.

Typically, two beams of infrared radiation are passed through the analyzer and strike separate resistance elements 26 and 28. Preferably these elements are nickel windings which are extremely sensitive to variations in the infrared energy passing from the analyzer cells. It will be understood that the infrared source will provide a beam of infrared radiation of constant intensity but that this beam will be attenuated in a varying manner before striking the nickel windings because of absorption by the carbon passing through the analyzers.

The resistance elements 26 and 28 comprise two arms of a self-balancing Wheatstone bridge 30 which also includes resistance elements 32 and 34 each having a slide 36 and 38. The two slides are connected by leads 40 and 42 to an amplifier 44. The amplifier in turn is connected by a lead 46 to a servo-motor 48 which is mechanically connected to the slide 38. It will be understood that any voltage difference between the slides 36, 38 by reason of attenuation of the radiation striking the windings 26 and 28, will generate a signal which will be amplified to drive the servo-motor. The motor 48 will thereby move the slide 38 to return the bridge to a balanced condition.

The amplitude of this voltage difference will depend upon the degree of change in resistance of the detector windings 26, 28 whereas the phase of this voltage difference will depend upon which of the two detector windings 26, 28 has its resistance altered and whether the alteration is an increase or decrease.

A second servo-motor 50 is mechanically connected to the slide 36 and is provided so that compensation may be made for room temperature and any long term drift before running a specimen through the apparatus.

The servo-motor 48 has its shaft 52 connected to a pair of variable oscillators 54 and 56, each having a normal frequency of perhaps 15,000 cycles. In a preferred embodiment, and when a linear characteristic is required, the frequencies of two oscillators may be varied through a range of 0–750 cycles or increments thereof. The oscillators are so connected to the shaft 52 that any angular movement of the shaft from a rest position will cause one of the oscillators to increase in frequency while causing the other oscillator to decrease a like amount. With each oscillator having a range of 0–750 cycles, it is thus possible to produce a maximum frequency difference of 1500 cycles between the two oscillators. The outputs of the two oscillators are fed into a mixer 58 where the two frequencies are combined and the difference frequency output passed to a combination electrical and electro-mechanical scaling register indicated generally by the reference character 60. The difference or intermediate frequency, of course, will vary from 0–1500 cycles depending upon the position of the shaft 52 which in turn will vary with the concentration of $CO_2$ passing through the analyzer.

When the operation of the infrared analyzer is such that the response of the detectors is not linearly proportional to the concentration of the substance being analyzed, it is possible to introduce a correction to make the difference frequency or its integral a true measure of the concentration. This correction can take the form of obtaining various frequency characteristics by shaping the variable capacitor plates to obtain a desired characteristic, and also by rotating a tap switch to switch in additional auxiliary adjustable capacitors to provide the desired function.

This scaling register 60 counts the cycles of the difference frequency and provides a visual numerical display which corresponds to the total amount of carbon present in the specimen 16. A suitable alarm arrangement (not shown) may be provided to signal the operator in the event that the concentration of the analyzed gas exceeds the capacity of the bridge.

In FIG. 2 there appears a diagram of a transistorized oscillator circuit employed in each of the oscillators 54 and 56 of FIG. 1. The operation of this circuit is such that nearly pure sine waves appear at the two ends of the inductance and at the base and collector of the transistor component.

The circuit includes a pair of leads 70 and 72 connected to a power source B with the lead 70 serially connecting a current limiting resistor $R_1$ and a capacitor $C_2$ to one side of an inductance T.

A PNP transistor Q is connected between the leads 70 and 72 by means of a lead 74 connecting the emitter to the lead 72 and a lead 76 connecting the collector to the lead 70. The base of the transistor is connected by a lead 78 to a side of the inductance T opposite the side to which the lead 70 is connected. The bias for the transistor appears across the resistor $R_2$ which is connected in parallel between the leads 76 and 78 by a lead 80. A capacitor $C_3$ of fixed value is connected between the leads 70 and 72, with the connection to the lead 70 being made between the resistor $R_1$ and the capacitor $C_2$. A capacitor $C_4$ of fixed value is connected between leads 78 and 72.

In practice, the capacitor $C_4$ is greater than the capacitor $C_3$ which, in turn, is greater than the capacitor $C_2$. The variable capacitor $C_1$ is mechanically connected by the shaft 52 and appropriate gearing to the servo-motor 48. It will be understood that angular movement of the shaft 52 will vary the frequency of each of the oscillators, one undergoing an increase in frequency while the other decreases in frequency.

The value of the capacitor $C_2$ has been made small so as to decouple the tuning components from the transistor, thereby making the oscillating frequency comparatively independent of the transistor parameter variations. The circuit is capable of providing a linear change in oscillating frequency within a tolerance of .1%. Since linear integrating action is dependent upon having linear changes in frequency, it will be evident that particularly accurate results are obtainable.

In operation, the furnace 10 is charged with a specimen which is oxidized upon the admission of oxygen. Any resulting gaseous oxides pass through the two infrared analyzers 18 and 20 and are exhausted to the atmosphere. The signal, generated by the bridge 30 in response to variations of resistance in the detecting elements, is amplified to drive the servo-motor 48 so that the shaft angle is a function of the concentrations of carbon and sulfur in the vaporized specimen. Rotation of the shaft 52 will operate to vary simultaneously the frequencies of the two oscillators 52 and 56 by movement of the variable capacitor C in each oscillator circuit. As previously stated, the frequency of one oscillator will be increased while the other is decreased with intergration being achieved by feeding the two frequencies into a mixer and counting the pulses of the difference frequency. The resulting tabulation corresponds to the total amount of carbon and sulfur contained in the specimen.

At the beginning of each analysis, the detector bridge is balanced automatically by the servo 50 but a slow drift effect may exist through the time during which the analysis is being made. Since the desired detector response is greater than the magnitude of the drift, an auxiliary switch 90 connected to the shaft 52 of the servo-motor 48 and to the counter 60 through leads 92, 94 may be used to stop the integration process by disconnecting the counter except when the servo-motor shaft has rotated sufficiently to indicate that its position is more a function of the desired effect than of the drift. In this case the integration is carried out correctly in reference to the original zero point, independently of any drift.

In FIG. 3 there is illustrated a graph on which there appears a typical curve 95 representing the concentration of $CO_2$ as plotted over a cycle of operation of the apparatus. It will be noted that the curve, while having a high peak, is of very short duration in relation to the span of operation. In the graph, time is represented along the abscissa with the ordinate representing the position of the servo 48 along the potentiometer 34. Since the servo may drift from zero during a cycle of operation and cause the counter to give an erroneous tabulation, the switch 90 is provided to disable the counter except at the occurrence of a positive signal. As shown in FIG. 3 the dotted lines 96 define a zone in which the counter. As soon as a positive signal is received the 48 may drift from its zero setting without actuating the counter. As soon as a positive signal is received the servo shaft will rotate sufficiently for the switch 90 to close the circuit to the counter 60 causing it to tabulate the output of the mixer. Since the rate of counting increases as the servo moves up the potentiometer the counting rate is not disturbed by the disabling of the counter within the zone described. When the circuit to the counter is closed the tabulation produced will be at a true rate from zero although, for a period, the counter was disabled at some value above zero.

A timing circuit is provided for controlling automatically the operation of the anlyzer. With automatic operation more reproducible performance is possible than with manual operation and the time and attention required by the operator is substantially reduced.

As shown in FIG. 1 the timing circuit includes a pair of clocks with clock #1 being mechanically connected to a valve 96 located in the line between the oxygen source 12 and the regulator 14. Clock #1 is electrically connected to the servo-motor 50 by leads 97 and to clock #2 by leads 99. Clock #2 in turn is electrically connected to the servo-motor 48 by leads 100 and to the counter 60 by leads 98.

The timing system operates in the following manner. Assuming the furnace 10 is of the resistance type, several hours are required for it to heat up to operating temperature. Once the proper temperature has been reached the specimen is placed in the furnace and a switch 102 is closed to start clock #1. This clock has been pre-set to run for one or two minutes during which time the specimen comes up to the temperature of the furnace and the circuit to motor 50 through the leads 97 is closed so that the servo may zero balance the bridge 30. When clock #1 times out the valve 96 is opened to admit oxygen to the furnace, the balancing servo 50 is disconnected, the measuring servo 48 is energized and the counter starts integrating. Clock #2 is pre-set for a predetermined time which will be sufficient for the sample to be entirely burned and all of the gases measured. When clock #2 times out the oxygen valve 96 is closed and the resulting tabulation locked in the counter by opening the circuit through the leads 98.

In the event that the furnace is of the inductance type, the timing system may be slightly modified so that clock #1 will admit oxygen immediately to the furnace to pre-flush system while the bridge is being balanced. When clock #1 times out clock #2 will be started. Clock #2 will thereupon energize the inductance furnace which will heat up immediately in contrast to the resistance furnace which may require up to four hours of pre-heating. At the end of the burn clock #2 will time out thus locking in the tabulation, deenergizing the furnace and turning off the oxygen supply.

While the invention has been described with particular reference to the illustrated embodiment, it will be understood that numerous modifications thereof will appear to those skilled in the art.

Having thus described our invention, what we claim and desire to obtain by Letters Patent of the United States is:

1. Apparatus for quantitatively analyzing a chemical compound, comprising an analyzer adapted to detect the presence of a predetermined substance in said compound and to detect variations in concentration thereof, a bridge circuit, first and second potentiometers forming part of said circuit and each having a slider associated therewith, said analyzer including first and second resistance elements forming part of said circuit, said resistance elements being operatively associated with said analyzer and being variable in response to changes in concentration of said substance, a motor responding to a voltage difference between said sliders to adjust one of said sliders and thereby balance said bridge circuit, a pair of variable oscillators, means connecting said motor to said oscillators for simultaneously increasing the frequency of one oscillator and decreasing the frequency of the other oscillator, means for mixing the frequencies of both oscillators and means for counting the pulses of the difference frequency output of said mixer, the resulting count corresponding to the total amount of said substance in said compound.

2. Apparatus for quantitatively analyzing a compound having a constituent that displays radiant energy absorption characteristics, comprising an infrared analyzing chamber, means for delivering a compound in a gaseous state through said chamber, a self-balancing bridge, at least one temperature-sensitive element in circuit with said bridge, a source of infrared energy focused through said chamber and against said element whereby the energy striking said element will be attenuated according to the concentration of the energy-absorbing constituent, servo means associated with said bridge and responsive to changes in resistance of said element to maintain said bridge in balance, a pair of oscillators operatively connected to said servo means, actuation of said servo means in response to an imbalance of said bridge being operative to increase the frequency of one of said oscillators and decrease the frequency of the other oscillator and means for counting the cycles of the difference in frequency between the two oscillators over a predetermined period, the count corresponding to the total amount of said constituent in said compound.

3. Apparatus for quantitatively analyzing a chemical compound, comprising an infrared analyzer adapted to detect the presence of a predetermined substance in said compound and to detect variations in concentration thereof, a self-balancing bridge circuit, at least one potentiometer forming part of said circuit and each having a slider associated therewith, said analyzer including at least one resistance element forming part of said circuit, said resistance element being operatively associated with said analyzer and being variable in response to change in concentration of said substance, a motor operatively responsive to a voltage difference across said bridge to adjust said slider and thereby balance said bridge circuit, a pair of variable electronic oscillators, means connecting said motor to said oscillators for simultaneously increasing the frequency of one oscillator and decreasing the frequency of the other oscillator an equal amount, means for mixing the frequencies of both oscillators, and means for counting the total number of cycles of the difference frequency output of said mixer for a predetermined period, the count corresponding to the total detected amount of said substance.

4. Apparatus for quantitatively analyizing a compound having a constituent that displays radiant energy absorption characteristics, comprising a self-balancing bridge, at least one temperature sensitive resistance element in circuit with said bridge, a source of radiant energy adapted to direct a beam of energy against said element, means for delivering said compound between said source and said element whereby the energy striking said element is attenuated in proportion to the concentration of the energy absorbing constituent, servo means associated with said bridge and responsive to changes in resistance of said elements to maintain said bridge in balance, a pair of variable electronic oscillators operatively connected to said servo means, actuation of said servo means in response to an imbalance of said bridge being operative to increase the frequency of one of said oscillators, and decrease the frequency of the other by an equal amount, electronic mixing means for detecting the frequency difference between said oscillators and means for counting the cycles of the difference frequency.

5. Apparatus according to claim 4 wherein said counting means includes an electric pulse counter adapted to present a numerical display representative of the total concentration of the constituent present in said compound.

6. Apparatus for determining the total amount of a constituent present in a given compound comprising a monitoring station, means for delivering said compound through said station, sensing means adapted to detect the presence of said constituent, said sensing means being further adapted to generate a signal representative of variations in concentration of said constituent, servo means associated with said sensing means responsive to said signal, a pair of oscillators operatively connected to said servo means, actuation of said servo means in response to said signal being operative to increase the frequency of one oscillator and decrease the frequency of the other, means for detecting the frequency difference between said oscillators and means for counting the cycles of the difference frequency.

7. Apparatus according to claim 6 wherein said sensing means includes an infrared analyzer.

8. Apparatus for quantitatively analyzing a chemical compound, comprising an analyzer adapted to detect the presence of a predetermined substance in said compound and to detect variations in concentration thereof, a bridge circuit, first and second potentiometers forming part of said circuit and each having a slider associated therewith, said analyzer including first and second resistance elements forming part of said circuit, said resistance elements being operatively associated with said analyzer and being variable in response to changes in concentration of said substance, a motor responsive to a voltage difference between said sliders to adjust one of said sliders and thereby balance said bridge circuit, a pair of variable oscillators, means connecting said motor to said oscillators for simultaneously increasing the frequency of one oscillator and decreasing the frequency of the other oscillator as said motor responds to an unbalanced condition of said bridge, means for mixing the frequencies of both oscillators, counting means for measuring the difference frequency output of said mixer, and switching means for decoupling said counting means from said mixer over the drift range of said motor.

9. Apparatus for quantitatively analyzing a chemical compound, comprising an analyzer adapted to detect the presence of a predetermined substance in said compound and to detect variations in concentration thereof, a bridge circuit, first and second potentiometers forming part of said circuit and each having a slider associated therewith, said analyzer including first and second resistance elements forming part of said circuit, said resistance elements being operatively associated with said analyzer and being variable in response to changes in concentration of said substance, a motor responsive to a voltage difference between said sliders to adjust one of said sliders and thereby balance said bridge circuit, a pair of variable oscillators, means connecting said motor to said oscillators for simultaneously increasing the frequency of one oscillator and decreasing the frequency of the other oscillator, means for mixing the frequencies of both oscillators, counting means for measuring the total cycles of the difference frequency output of said mixer, and means for disabling said counting means over the range of drift of said motor.

10. Apparatus for quantitatively analyzing a compound having a constituent that displays radiant energy absorption characteristics, comprising an infrared analyzing chamber, a gas source, flow control means connecting said gas source to said chamber for delivering a compound in a gaseous state through said chamber, a self-balancing bridge, at least one temperature-sensitive element in circuit with said bridge, a source of infrared energy focused through said chamber and against said element whereby the energy striking said element will be attenuated according to the concentration of the energy-absorbing constituent, first and second servo means associated with said bridge, said first servo means being adapted to balance said bridge against changes in ambient conditions, said second servo means being responsive to changes in resistance of said element to maintain said bridge in balance, a pair of oscillators operatively connected to said second servo means, actuation of said second servo means in response to an imbalance of said bridge being operative to increase the frequency of one of said oscillators and decrease the frequency of the other oscillator, means for counting the cycles of the difference frequency, a pair of timing devices for operating the several components in automatic predetermined sequence, said first timing device being adapted sequentially to energize said first servo means to pre-balance said bridge and then to open said flow control means to admit gas to said chamber, said first timing device then starting said second timing device, said second timing device being adapted to energize said second servo means and to start said counting means and then to close said flow control means, de-energize said second servo means and stop said counting means.

References Cited in the file of this patent

UNITED STATES PATENTS

| | | |
|---|---|---|
| 2,332,943 | Sobers | Oct. 26, 1943 |
| 2,741,941 | Madsen et al. | Apr. 17, 1956 |
| 2,899,648 | Gregory | Aug. 11, 1959 |
| 2,908,820 | Parsons | Oct. 13, 1959 |
| 2,930,033 | Webb | Mar. 22, 1960 |
| 2,934,646 | Parsons | Apr. 26, 1960 |
| 2,962,360 | Bennet et al. | Nov. 29, 1960 |
| 2,972,116 | Lowe | Feb. 14, 1961 |
| 2,975,280 | Waters | Mar. 14, 1961 |
| 2,986,633 | Martin | May 30, 1961 |